US012597198B2

(12) United States Patent (10) Patent No.: US 12,597,198 B2
Park (45) Date of Patent: Apr. 7, 2026

(54) RAY TRACING METHOD AND APPARATUS BASED ON ATTENTION FOR DYNAMIC SCENES

(71) Applicant: SiliconArts Technology US Inc., Waco, TX (US)

(72) Inventor: Woo Chan Park, Seoul (KR)

(73) Assignee: SiliconArts Technology US Inc.

( * ) Notice: Subject to any disclaimer, the term of this patent is extended or adjusted under 35 U.S.C. 154(b) by 199 days.

(21) Appl. No.: 18/267,368

(22) PCT Filed: Nov. 2, 2021

(86) PCT No.: PCT/KR2021/015700
§ 371 (c)(1),
(2) Date: Jun. 14, 2023

(87) PCT Pub. No.: WO2022/131531
PCT Pub. Date: Jun. 23, 2022

(65) Prior Publication Data
US 2024/0046549 A1 Feb. 8, 2024

(30) Foreign Application Priority Data

Dec. 15, 2020 (KR) ........................ 10-2020-0175079

(51) Int. Cl.
G06T 15/06 (2011.01)
G06T 3/4007 (2024.01)
G06T 7/90 (2017.01)
(52) U.S. Cl.
CPC ........... G06T 15/06 (2013.01); G06T 3/4007 (2013.01); G06T 7/90 (2017.01); G06T 2207/10024 (2013.01)

(58) Field of Classification Search
CPC .............................. G06T 15/06; G06T 3/4007
See application file for complete search history.

(56) References Cited

U.S. PATENT DOCUMENTS 9,237,849 B1 * 1/2016 McKenzie ........... A61B 5/0033
2017/0287446 A1 10/2017 Young et al.
2018/0165792 A1 6/2018 Tavakoli et al.

FOREIGN PATENT DOCUMENTS

KR 10-2009-0092618 A 9/2009
KR 10-2012-0092926 A 8/2012
(Continued)

OTHER PUBLICATIONS

International Search Report for PCT/KR2021/015700 mailed Mar. 25, 2022 from Korean Intellectual Property Office.
(Continued)

*Primary Examiner* — Matthew Salvucci
(74) *Attorney, Agent, or Firm* — BROADVIEW IP LAW, PC

(57) ABSTRACT

A visual attention-based ray tracing method includes: determining whether each sampling pixel hits a primary ray during a process of generating a first image by rending a specific scene at a first resolution; and performing selective rendering repeatedly on candidate pixels existing between the sampling pixels during a process of generating a second image by rendering the first image at a second resolution higher than the first resolution through adaptive adjustment of a threshold due to hit frequencies of neighboring pixels.

13 Claims, 7 Drawing Sheets

(56)            References Cited

FOREIGN PATENT DOCUMENTS

| KR | 10-2015-0039493 A | | 4/2015 |
| KR | 10-1869912 B1 | | 6/2018 |
| KR | 101869912 | * | 6/2018 |

OTHER PUBLICATIONS

Korean Office Action for related KR Application No. 10-2020-0175079 mailed Nov. 24, 2022 from Korean Intellectual Property Office.

* cited by examiner

Figure 5:
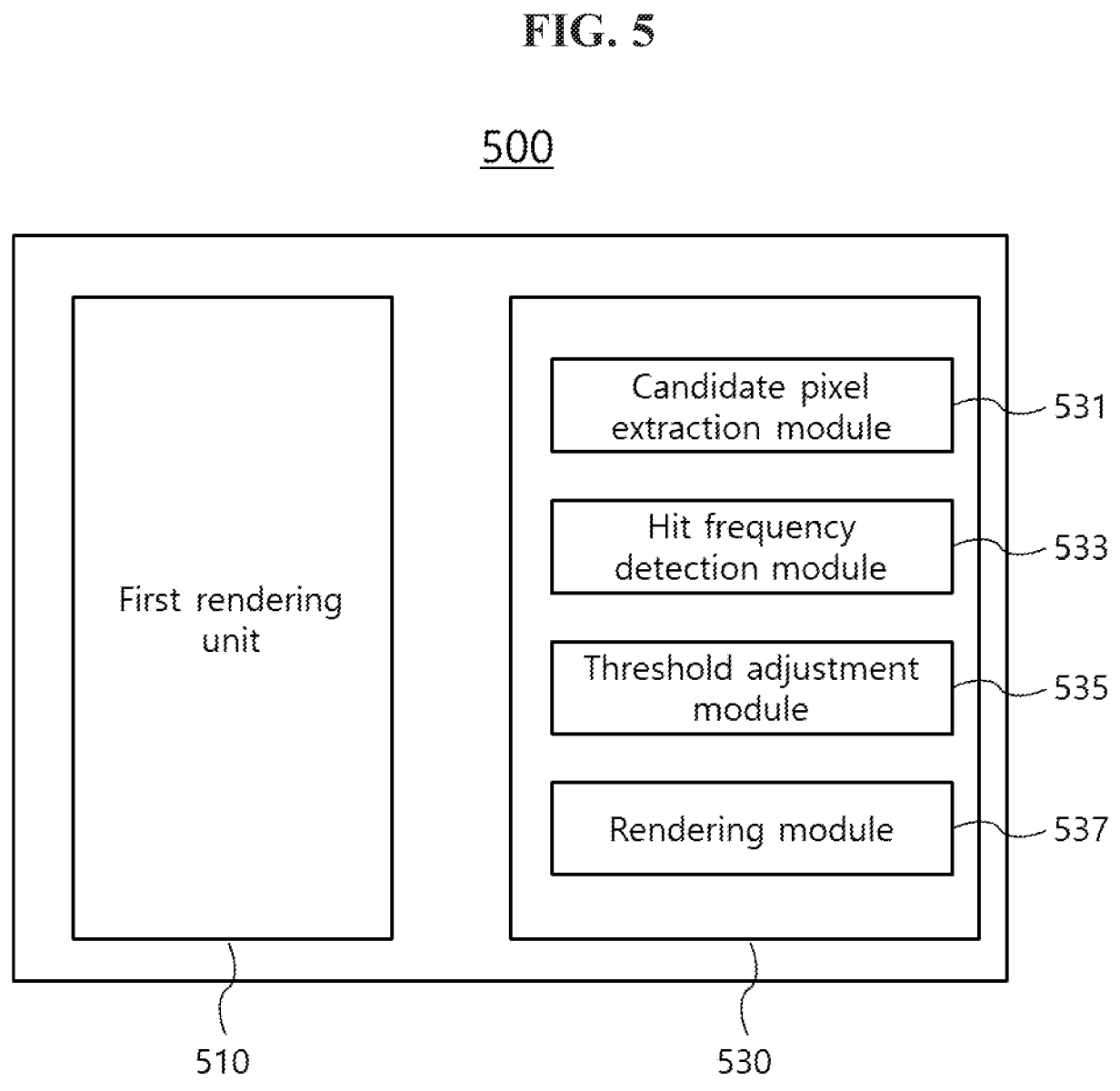

510 First rendering unit

530

531 Candidate pixel extraction module

533 Hit frequency detection module

535 Threshold adjustment module

537 Rendering module

1

RAY TRACING METHOD AND APPARATUS BASED ON ATTENTION FOR DYNAMIC SCENES

CROSS-REFERENCE TO PRIOR APPLICATIONS

This application is a National Stage patent application of PCT International Application No. PCT/KR2021/015700 (filed on Nov. 2, 2021), which claims priority to Korean Patent Application No. 10-2020-0175079 (filed on Dec. 15, 2020), which are all hereby incorporated by reference in their entirety.

BACKGROUND

The present disclosure relates to a three-dimensional (3D) graphics processing technology. More particularly, the present disclosure relates to a visual attention-based ray tracing method and device for a dynamic scene capable of performing rendering adaptively to a user's visual attention to the dynamic scene.

3D graphics technology is a branch of graphics technology that uses a 3D representation of geometric data stored in a computing device and is widely used today in various industries, including media and game industries. In general, 3D graphics technology requires a separate high-performance graphics processor due to a large amount of computation.

Along with advances in the processors, research has been underway to develop ray tracing technology that may generate photo-realistic 3D graphics.

Ray tracing technology relates to a rendering method based on global illumination. Ray tracing technology generates realistic 3D images by providing reflection, refraction, and shadow effects in a natural manner by simulating the effect of light reflected or refracted from another object on the image of a target object.

PRIOR ART REFERENCES

Patents

Korea laid-open patent 10-2015-0039493 (2015 Apr. 10)

SUMMARY

An object according to one embodiment of the present disclosure is to provide a visual attention-based ray tracing method and device for a dynamic scene capable of performing rendering adaptively to a user's visual attention to the dynamic scene.

Another object according to one embodiment of the present disclosure is to provide a visual attention-based ray tracing method and device for a dynamic scene capable of adaptively adjusting a threshold for selective rendering based on frequencies of hitting a static or dynamic scene by neighboring pixels.

A visual attention-based ray tracing method for a dynamic scene according to the embodiments comprises determining whether each sampling pixel hits a primary ray during a process of generating a first image by rending a specific scene at a first resolution; and performing selective rendering repeatedly on candidate pixels existing between the sampling pixels during a process of generating a second image by rendering the first image at a second resolution higher than the first resolution through adaptive adjustment of a threshold due to hit frequencies of neighboring pixels.

The determining of the occurrence of hitting may include determining whether the primary ray hits a static scene or a dynamic scene constituting the specific scene.

The determining of the occurrence of hitting may include determining the occurrence of hitting as a result of an intersection test on an acceleration structure (AS) corresponding to the static scene and the dynamic scene.

The performing repeatedly may include determining the hit frequency by counting the occurrence of hitting of neighboring pixels for each candidate pixel; and reducing a reference threshold when the hit frequency exceeds a preset reference count and increasing the reference threshold when the hit frequency is lower than the reference count.

The performing repeatedly may include reducing a reference threshold when a first hit frequency for a dynamic scene is higher than a second hit frequency for a static scene and increasing the reference threshold when the first hit frequency is lower than the second hit frequency.

The performing repeatedly may include determining a decrement or an increment for the reference threshold according to a) a difference between the hit frequency and the reference count or b) a difference between the first and second hit frequencies.

The performing repeatedly may include determining a color for a specific candidate pixel by applying an interpolation algorithm when a color difference between adjacent sampling pixels on both sides of the specific candidate pixel in the vertical or horizontal direction is smaller than an adjusted threshold.

The performing repeatedly may include determining a color for a specific candidate pixel by applying ray tracing when a color difference between adjacent sampling pixels on both sides of the specific candidate pixel in the vertical or horizontal direction is larger than an adjusted threshold.

The performing repeatedly may include providing the second image as a rendering result for the specific scene when the selective rendering is completed for all the candidate pixels.

A visual attention-based ray tracing device for a dynamic scene according to embodiments comprises a first rendering unit determining the occurrence of hitting of a primary ray for each sampling pixel during a process of generating a first image by rending a specific scene at a first resolution; and a second rendering unit performing selective rendering repeatedly on candidate pixels existing between the sampling pixels during a process of generating a second image by rendering the first image at a second resolution higher than the first resolution through adaptive adjustment of a threshold due to hit frequencies of neighboring pixels.

The second rendering unit may include a candidate pixel extraction module determining candidate pixels existing between sampling pixels of the first image; a hit frequency detection module detecting hit frequencies of neighboring pixels for a specific candidate pixel; a threshold adjustment module adjusting a reference threshold adaptively by comparing hit frequencies for a static scene and a dynamic scene; and a rendering module determining a color of the specific candidate pixel by performing the selective rendering according to the adjusted reference threshold.

The threshold adjustment module may reduce a reference threshold when a first hit frequency for the dynamic scene is higher than a second hit frequency for the static scene and increase the reference threshold when the first hit frequency is lower than the second hit frequency.

The threshold adjustment module may determine a decrement or an increment for the reference threshold according to a difference between the first and second hit frequencies.

The present disclosure may provide the following effects. However, since it is not meant that a specific embodiment has to provide all of or only the following effects, the technical scope of the present disclosure should not be regarded as being limited by the specific embodiment.

A visual attention-based ray tracing method and device for a dynamic scene according to one embodiment of the present disclosure may perform rendering adaptively to a user's visual attention to the dynamic scene.

A visual attention-based ray tracing method and device for a dynamic scene according to one embodiment of the present disclosure may adaptively adjust a threshold for selective rendering based on frequencies of hitting a static or dynamic scene by neighboring pixels.

BRIEF DESCRIPTION OF THE DRAWINGS

FIG. 2 shows one embodiment of a KD tree as an acceleration structure used in a ray tracing process.

FIG. 5 illustrates a functional structure of a ray tracing device according to the present disclosure.

DETAILED DESCRIPTION

Figure 1:
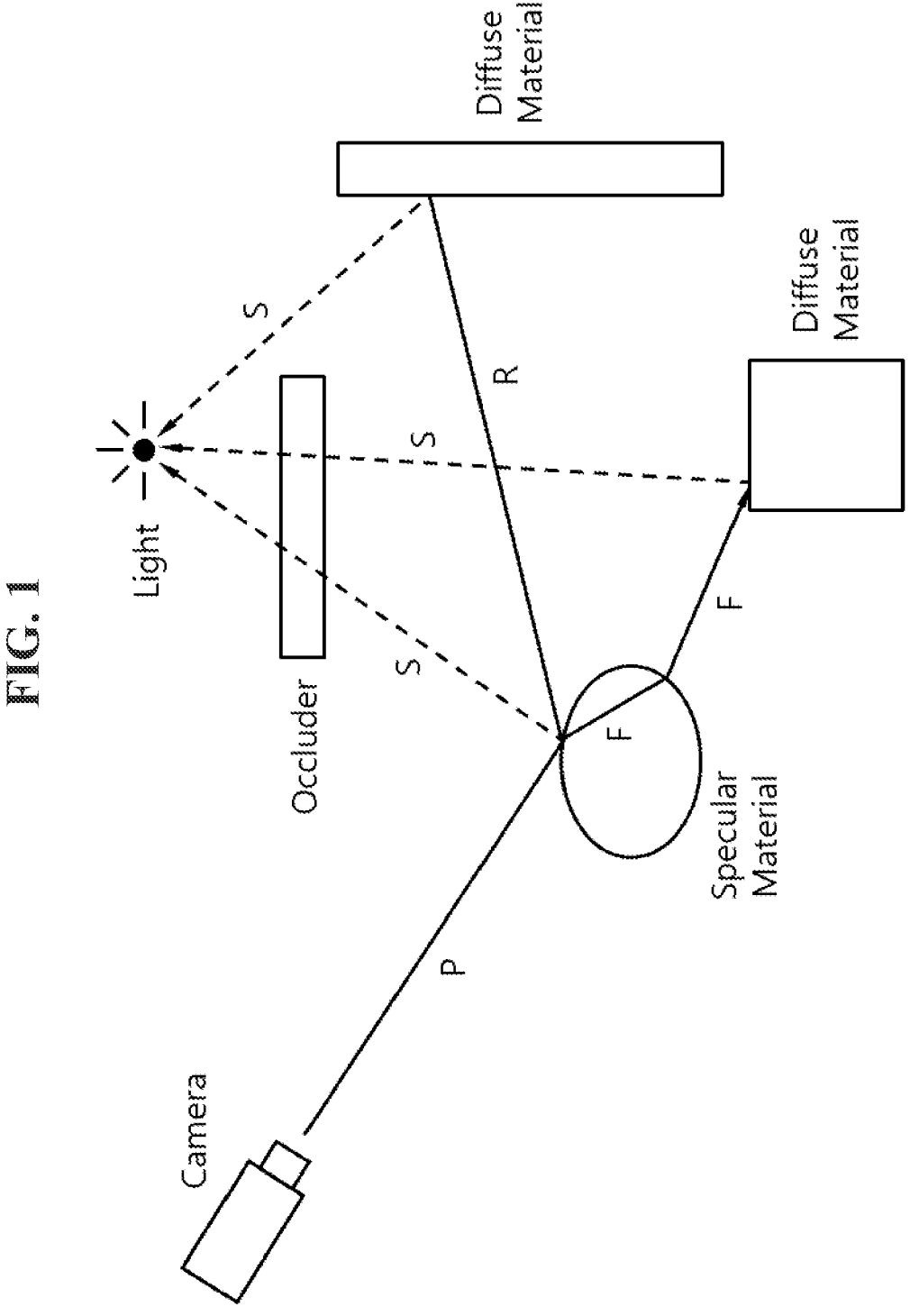
FIG. 1 shows one embodiment of a ray tracing process.

Since the description of the present disclosure is merely an embodiment for structural or functional explanation, the scope of the present disclosure should not be construed as being limited by the embodiments described in the text. That is, since the embodiments may be variously modified and may have various forms, the scope of the present disclosure should be construed as including equivalents capable of realizing the technical idea. In addition, a specific embodiment is not construed as including all the objects or effects presented in the present disclosure or only the effects, and therefore the scope of the present disclosure should not be understood as being limited thereto.

On the other hand, the meaning of the terms described in the present application should be understood as follows.

Terms such as "first" and "second" are intended to distinguish one component from another component, and the scope of the present disclosure should not be limited by these terms. For example, a first component may be named a second component and the second component may also be similarly named the first component.

It is to be understood that when one element is referred to as being "connected to" another element, it may be connected directly to or coupled directly to another element or be connected to another element, having the other element intervening therebetween. On the other hand, it is to be understood that when one element is referred to as being "connected directly to" another element, it may be connected to or coupled to another element without the other element intervening therebetween. Meanwhile, other expressions describing a relationship between components, that is, "between," "directly between," "neighboring to," "directly neighboring to," and the like, should be similarly interpreted.

It should be understood that the singular expression includes the plural expression unless the context clearly indicates otherwise, and it will be further understood that the terms "comprises" or "have" used in this specification, specify the presence of stated features, numerals, steps, operations, components, parts, or a combination thereof, but do not preclude the presence or addition of one or more other features, numerals, steps, operations, components, parts, or a combination thereof.

Identification symbols (for example, a, b, and c) for individual steps are used for the convenience of description. The identification symbols are not intended to describe an operation order of the steps. Therefore, unless otherwise explicitly indicated in the context of the description, the steps may be executed differently from the stated order. In other words, the respective steps may be performed in the same order as stated in the description, actually performed simultaneously, or performed in reverse order.

The present disclosure may be implemented in the form of program code in a computer-readable recording medium. A computer-readable recording medium includes all kinds of recording devices storing data that a computer system may read. Examples of a computer-readable recording medium include a ROM, a RAM, a CD-ROM, a magnetic tape, a floppy disk, and an optical data storage device. Also, the computer-readable recording medium may be distributed over computer systems connected through a network so that computer-readable code may be stored and executed in a distributed manner.

Unless defined otherwise, all the terms used in the present disclosure provide the same meaning as understood generally by those skilled in the art to which the present disclosure belongs. Those terms defined in ordinary dictionaries should be interpreted to have the same meaning as conveyed in the context of related technology. Unless otherwise defined explicitly in the present disclosure, those terms should not be interpreted to have ideal or excessively formal meaning.

FIG. 1 shows one embodiment of a ray tracing process.

Referring to FIG. 1, a ray tracing method performed in a ray tracing device may correspond to a rendering method according to global illumination. The use of global illumination-based rendering may imply that light reflected or refracted from other objects also affects the image of a target object. As a result, realistic 3D images may be generated since reflection, refraction, and shadow effects are realized in a natural manner.

The ray tracing device may first generate a primary ray P from a camera position per pixel and perform calculations to find an object that intersects the ray. The ray tracing device may generate a reflection ray R for a reflection effect or a refraction ray F for a refraction effect at the intersection point where the ray and the object meet if the object hit by the ray has a reflection or refraction property; for a shadow effect, the ray tracing device may generate a shadow ray S in the direction of light.

Here, if the shadow ray directed to the corresponding light and an object meet, a shadow is created; otherwise, no shadow is created. The reflected ray and the refracted ray are called secondary rays, and the ray tracing device may perform calculations for each ray to find an object that intersects the ray. The ray tracing device may perform the above process recursively.

Figure 2:
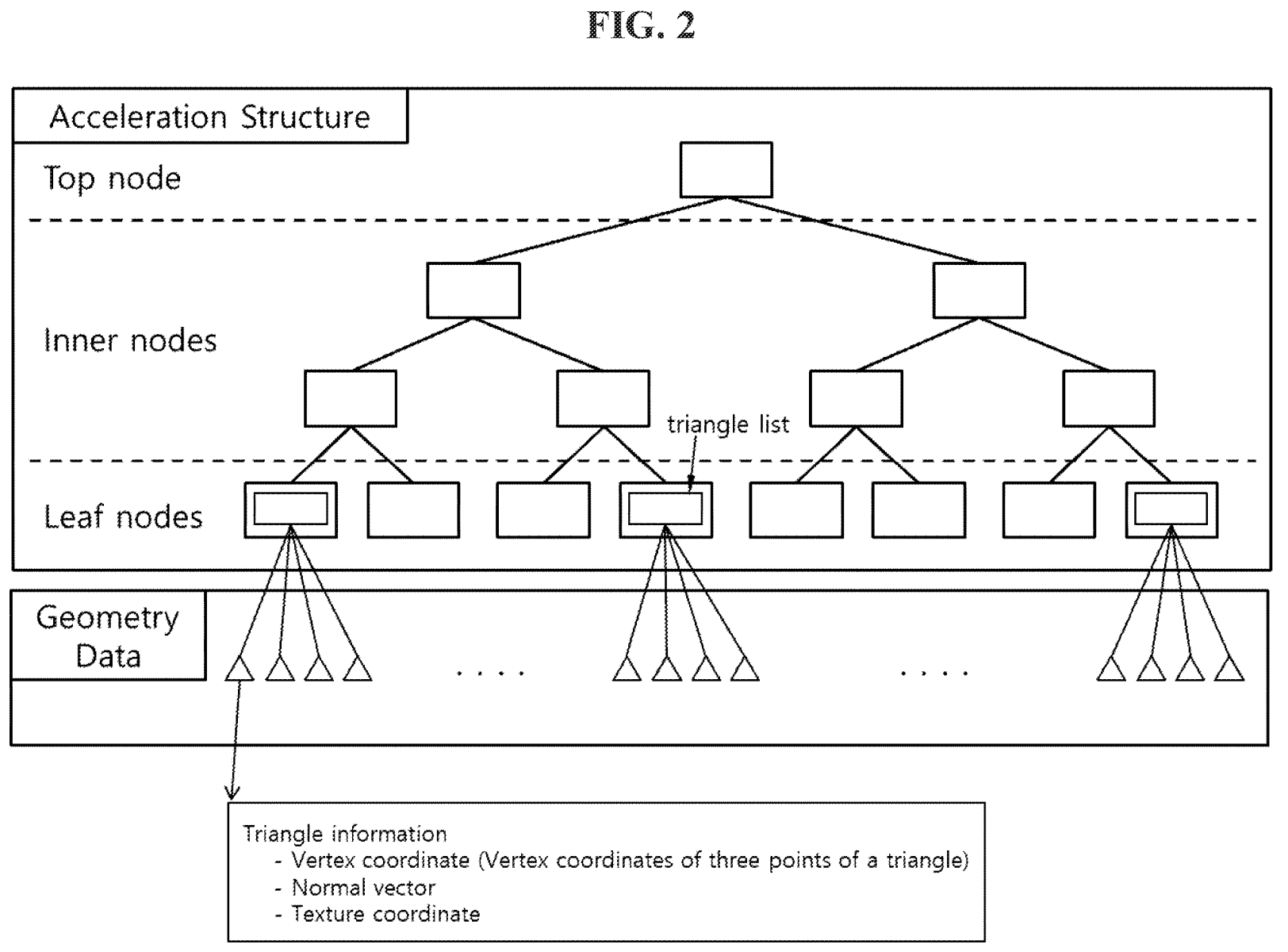

FIG. 2 shows one embodiment of a KD tree as an acceleration structure used in a ray tracing process.

Referring to FIG. 2, to perform ray tracing, an acceleration structure (AS), such as a KD tree or a Bounding Volume Hierarchy (BVH), generated based on the entire geometry data (consisting of the coordinates of triangles) is essential. Therefore, it is necessary to build an AS before performing ray tracing. Since building such an acceleration structure requires a lot of computation, it may take considerable time.

FIG. 2 illustrates the overall structure of a KD tree. The KD tree may correspond to a binary tree having a hierarchical structure for a partitioned space. A KD tree may consist of inner nodes (including the top node) and leaf nodes, and a leaf node may correspond to a space containing objects that intersect with the corresponding node. In other words, the KD tree is a spatial partitioning tree and may correspond to one of the spatial partitioning structures.

On the other hand, an inner node may occupy a bounding box-based spatial area, and the corresponding spatial area may be split into two areas and assigned to two lower nodes. As a result, an inner node may consist of a splitting plane and a sub-tree of two areas partitioned by the splitting plane, and a leaf node may contain only a series of triangles. For example, a leaf node may include a triangle list for pointing to at least one triangle information included in geometric data; the triangle information may include vertex coordinates for three points of the triangle, normal vectors, and/or texture coordinates. If triangle information in the geometric data is implemented as an array, the triangle list in a leaf node may correspond to the array index.

On the other hand, the space-partitioning position p may correspond to the point where the cost (the number of node visits, the number of times for calculating whether a ray intersects a triangle, and so on) to find a triangle that hits an arbitrary ray is minimized; the most popular method used to find the corresponding position p may be the surface area heuristic (SAH).

Figure 3:
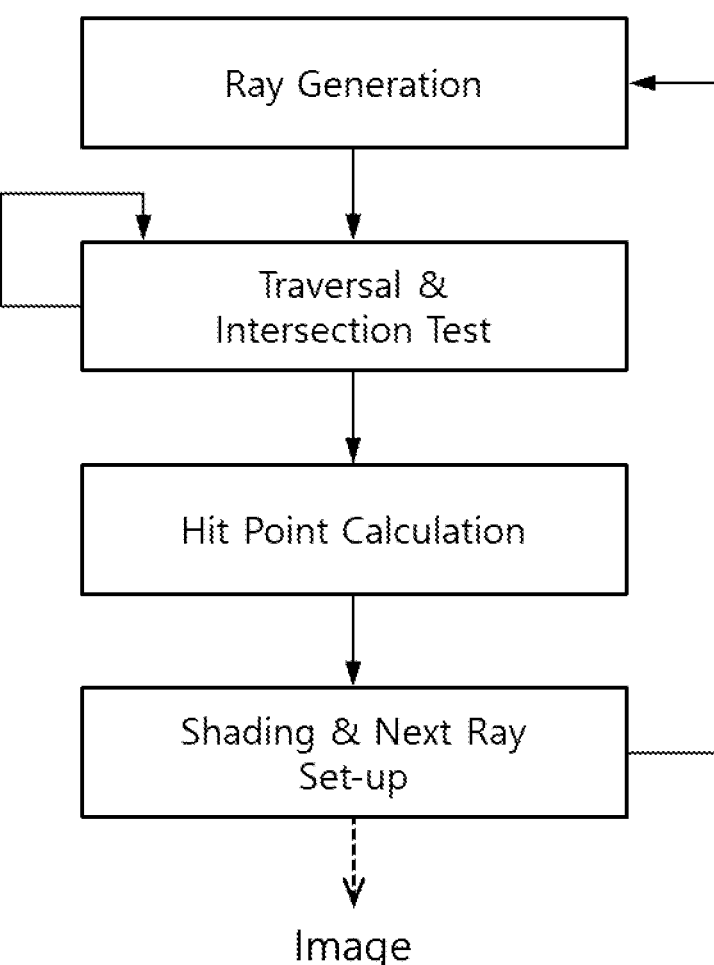
FIG. 3 illustrates a processing order of a ray tracing process.

FIG. 3 illustrates a processing order of a ray tracing process.

Referring to FIG. 3, a ray tracing process may largely include a ray generation step, a traversal & intersection test step, a hit point calculation step, and a shading & next ray set-up step.

First, the ray generation step may generate a primary ray from a viewpoint position for each pixel. Next, the ray generation step may search the acceleration structure (AS), such as a kd-tree and a bounding volume hierarchy (BVH), to find a leaf node intersecting the ray. Here, the leaf node stores information on triangles.

Next, the traversal & intersection test step may test all triangles belonging to the intersecting leaf node to determine whether the triangle meets the ray. The process may be repeated until a triangle that meets the ray is found. Afterward, the hit point calculation step may calculate a hit point for a triangle that meets the ray.

Next, the shading step may calculate the color value at the ray-triangle hit point. If the generation of shadow rays due to lighting or the generation of secondary rays due to the material of a colliding triangle is required, the information related to the generation may be determined in the next ray set-up step and may be transmitted to the ray generation step. The ray generation step may generate shadow rays and secondary rays based on the information.

Figure 4:
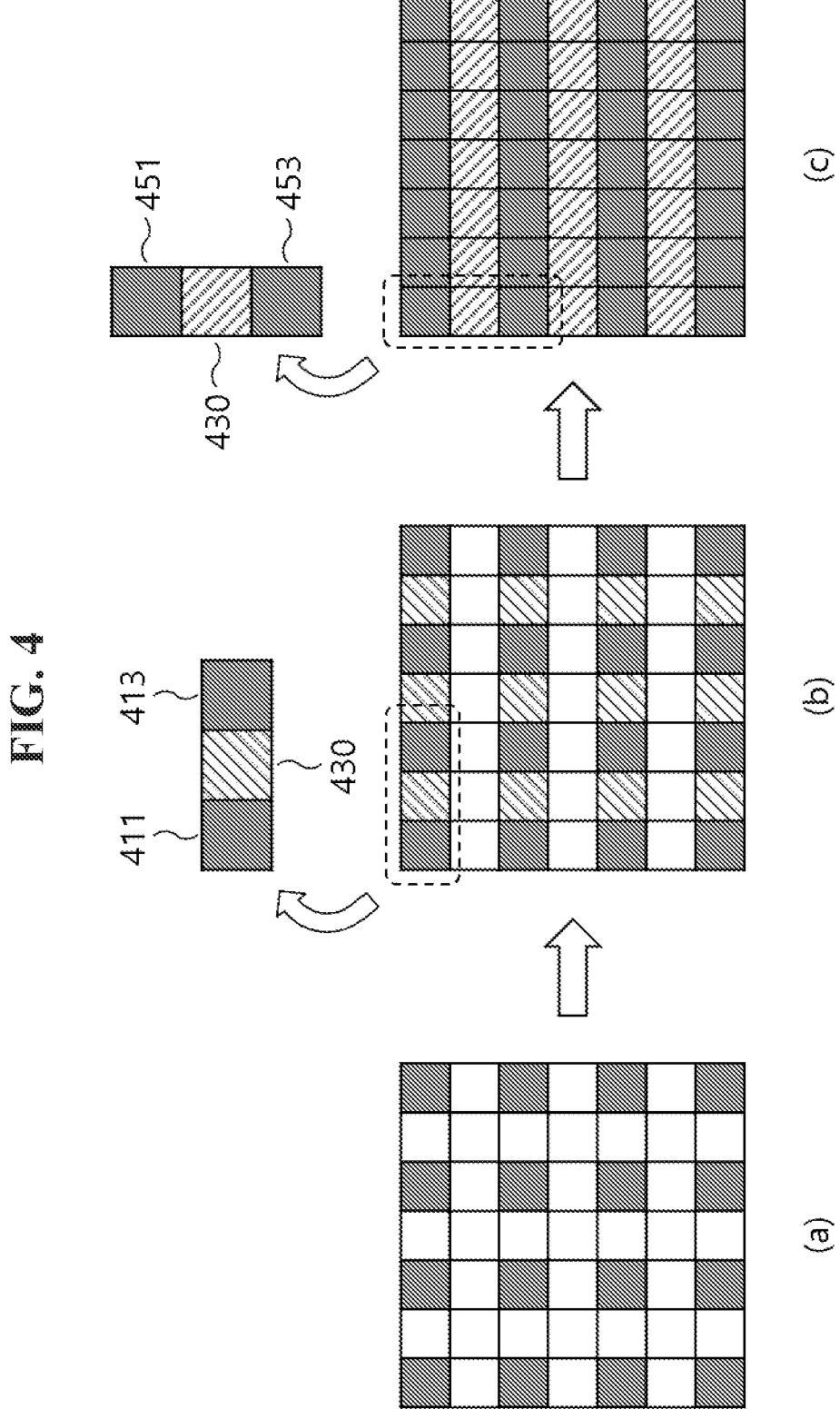
FIG. 4 illustrates an operational process of selective rendering.

FIG. 4 illustrates an operational process of selective rendering.

Referring to FIG. 4, rendering typically performs sampling on the entire pixels; if the number of pixels is smaller than the number of samples, unsampled pixels may be generated by interpolating adjacent pixel values.

First, sampling may be performed by skipping every other x- and y-coordinate. This sampling may yield the same result obtained by rendering at a low resolution. As a result, rendering is performed on the pixels of grey color in FIG. 4(a) to generate pixels at the corresponding positions while unrendered pixels remain white. As shown in FIG. 4(b), for an unrendered pixel 430, interpolation is applied using horizontal pixel values 411, 413 on the same row to generate a pixel at the corresponding position.

After the step of FIG. 4(b) is completed, as shown in the step of FIG. 4(c), interpolation is applied for the unrendered pixel 430 using vertical pixel values 451, 453 to generate a pixel at the corresponding position. The embodiment of FIG. 4 assumes that sampling is performed by skipping every other x- and y-coordinate; however, the present disclosure is not necessarily limited to the assumption above, and sampling may be performed by skipping pixels with a larger interval if necessary.

Selective rendering may be performed in a manner of determining whether to perform interpolation or sampling on a unsampled portion according to a color difference threshold. For example, assuming that the threshold is set to 16, interpolation may be performed if the color difference between sampled neighboring pixels is 16 or less, and sampling may be performed if the color difference exceeds 16. Therefore, if a threshold applied to selective rendering is increased, rendering performance may increase, but image quality may decrease. By adjusting the threshold in this way, rendering performance and image quality may be adaptively selected.

FIG. 5 illustrates a functional structure of a ray tracing device according to the present disclosure.

Referring to FIG. 5, the ray tracing device 500 may include a first rendering unit 510, a second rendering unit 530, and a controller.

The first rendering unit 510 may generate a first image by rendering a specific scene at a first resolution. At this time, the first resolution may correspond to a relatively low resolution. Accordingly, on average, the rendering speed is made fast, while the image quality of the first image may be low. In other words, the first rendering unit 510 may quickly generate a low-resolution image in the first stage and provide basic information for generating a high-resolution image during the process of generating an image of a specific scene. In one embodiment, the first rendering unit 510 may collect, for each sampling pixel, information on the occurrence of hitting of a primary ray occurring at the corresponding position during the rendering process.

In one embodiment, the first rendering unit 510 may determine whether a primary ray hits a static or dynamic scene constituting a specific scene. The entire geometry data constituting a specific scene may be composed of a static scene in which geometry coordinates are always fixed and a dynamic scene in which geometry coordinates change along with frame progression. Accordingly, the first rendering unit 510 may detect whether a current ray hits a static or dynamic scene at a specific pixel position in a ray tracing process for generating a first image.

In one embodiment, the first rendering unit 510 may determine the occurrence of hitting as a result of an intersection test on an acceleration structure (AS) corresponding to a static or dynamic scene. If a dynamic scene exists in a specific scene, it is necessary to build the acceleration structure (AS) of FIG. 2 for geometry data each time the corresponding geometry data is changed. Accordingly, a specific scene's acceleration structure (AS) may be independently constructed for static and dynamic scenes. In the ray tracing process for a specific scene, the first rendering unit 510 may perform the intersection test on a current ray based on each of the acceleration structures for the static and dynamic scenes; as a result, the first rendering unit 510 may detect a triangle that hits the current ray. In other words, when a triangle hits the current ray, it may be determined that the current ray hits a scene related to the acceleration structure including the corresponding triangle.

The second rendering unit 530 may generate a second image by rendering the first image at a second resolution. In this case, the second resolution may correspond to a relatively high resolution; accordingly, the second resolution may be higher than the first resolution. For example, the second rendering unit 530 may generate a high-resolution second image as a rendering result by up-sampling the first image. Also, in the process of generating the second image, the second rendering unit 530 may perform rendering of the second image by repeatedly performing selective rendering on the candidate pixels between sampling pixels of the first image through adaptive threshold adjustment according to hit frequencies of neighboring pixels for candidate pixels between sampling pixels of the first image.

In one embodiment, the second rendering unit 530 may determine a hit frequency by counting the occurrence of hitting of neighboring pixels for each candidate pixel, reduce a reference threshold when the hit frequency exceeds a preset reference count, and increase the reference threshold when the hit frequency is lower than the reference count. Here, the reference threshold may be used as a selection criterion in the process of selectively determining whether to determine color through selective rendering, namely, interpolation or ray tracing. In other words, the second rendering unit 530 may perform rendering adaptive to visual attention by using information on the hitting of a ray.

Meanwhile, a total of eight pixels may exist around one pixel, and the second rendering unit 530 may adjust a reference threshold by collecting information on the number of hits at the positions of the eight neighboring pixels and the type of scene (e.g., a static or dynamic scene) causing hits. For example, the hit frequencies of neighboring pixels may be counted for static and dynamic scenes, respectively; if necessary, a single integrated value may express the hit frequencies of the static and dynamic scenes.

In one embodiment, the second rendering unit 530 may reduce a reference threshold when the first hit frequency for a dynamic scene is higher than the second hit frequency for a static scene and increase the reference threshold when the first hit frequency is lower than the second hit frequency. In other words, if the hit frequency for dynamic scenes is higher than the hit frequency for static scenes, a user's visual attention is high, and thus, the reference threshold may be reduced; in the opposite case, since the user's visual attention is low, the reference threshold may be increased. Therefore, decreasing the reference threshold may increase the ratio of performing ray tracing, which in turn may enhance the quality of a generated image. When the reference threshold is increased, the ratio of performing interpolation grows, which may decrease the quality of a generated image.

In one embodiment, the second rendering unit 530 may determine a decrement or an increment for a reference threshold according to a) a difference between a hit frequency and a reference count or b) a difference between first and second hit frequencies. In other words, the second rendering unit 530 may gradually increase the adjustment ratio of the reference threshold in proportion to the growing difference resulting from comparison. Meanwhile, the second rendering unit 530 may proportionally determine the adjustment size of the reference threshold based on the difference resulting from the comparison.

In one embodiment, the second rendering unit 530 may determine a color for a specific candidate pixel by applying an interpolation algorithm when a color difference between adjacent sampling pixels on both sides of the specific candidate pixel in the vertical or horizontal direction is smaller than an adjusted threshold. The second rendering unit 530 may determine a color for a specific candidate pixel by applying ray tracing when a color difference between adjacent sampling pixels on both sides of the specific candidate pixel in the vertical or horizontal direction is larger than the adjusted threshold.

In other words, selective rendering may improve the overall rendering performance by applying the rendering technique differently according to a comparison result of a color difference between adjacent pixels and a threshold value. In another embodiment, the second rendering unit 530 may perform selective rendering by comparing an average value of a color difference between pixels in a horizontal direction and a color difference between pixels in a vertical direction with a threshold value when adjacent pixels in vertical and horizontal directions are all available for a specific candidate pixel.

In one embodiment, the second rendering unit 530 may provide a second image as a rendering result for a specific scene when selective rendering is completed for all candidate pixels. The second rendering unit 530 may extract candidate pixels requiring rendering to generate a high-resolution second image from the low-resolution first image and repeatedly perform selective rendering on each candidate pixel. As a result, when the selective rendering process is performed for all candidate pixels, the second image may be generated as a result. The second rendering unit 530 may provide the second image as a rendering result for one frame and may repeatedly perform the same process along with frame progression.

In one embodiment, the second rendering unit 530 may include a plurality of modules that independently perform a rendering operation for generating a second image. More specifically, the second rendering unit 530 may include a candidate pixel extraction module 531 determining candidate pixels existing between sampling pixels of a first image; a hit frequency detection module 533 detecting hit frequencies of neighboring pixels for a specific candidate pixel; a threshold adjustment module 535 adjusting a reference threshold adaptively by comparing hit frequencies for a static scene and a dynamic scene; and a rendering module 537 determining a color of the specific candidate pixel by performing selective rendering according to an adjusted reference threshold.

The controller may control the overall operation of the ray tracing device 500 and manage a control flow or a data flow between the first rendering unit 510 and the second rendering unit 530.

Figure 6:
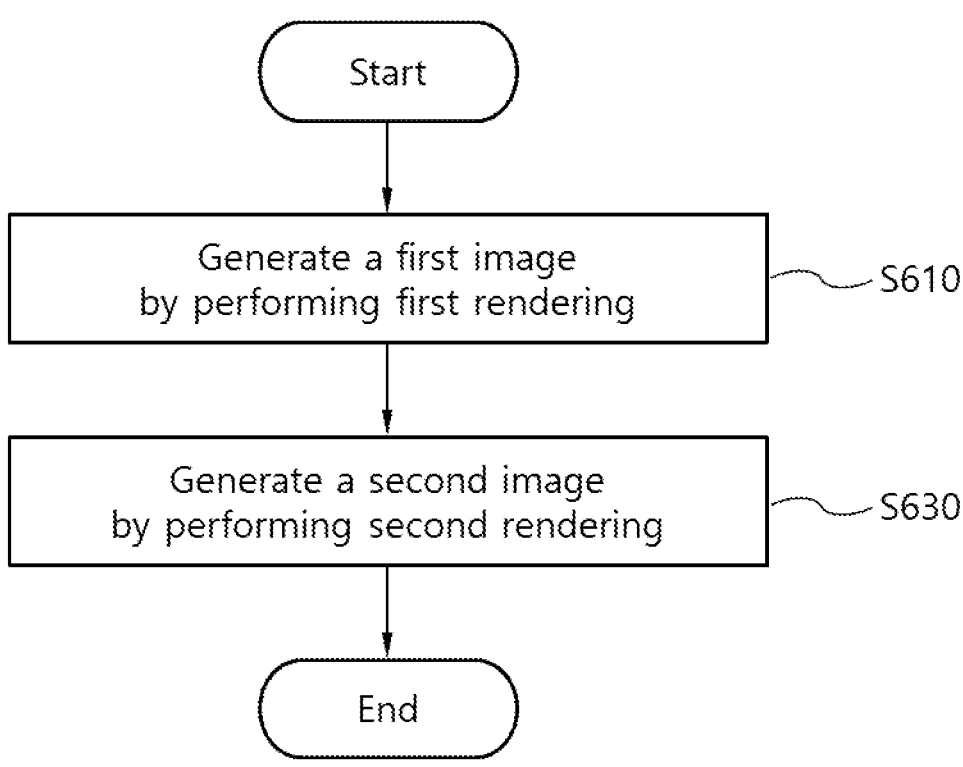
FIG. 6 is a flow diagram illustrating a ray tracing method according to the present disclosure.
Figure 7:
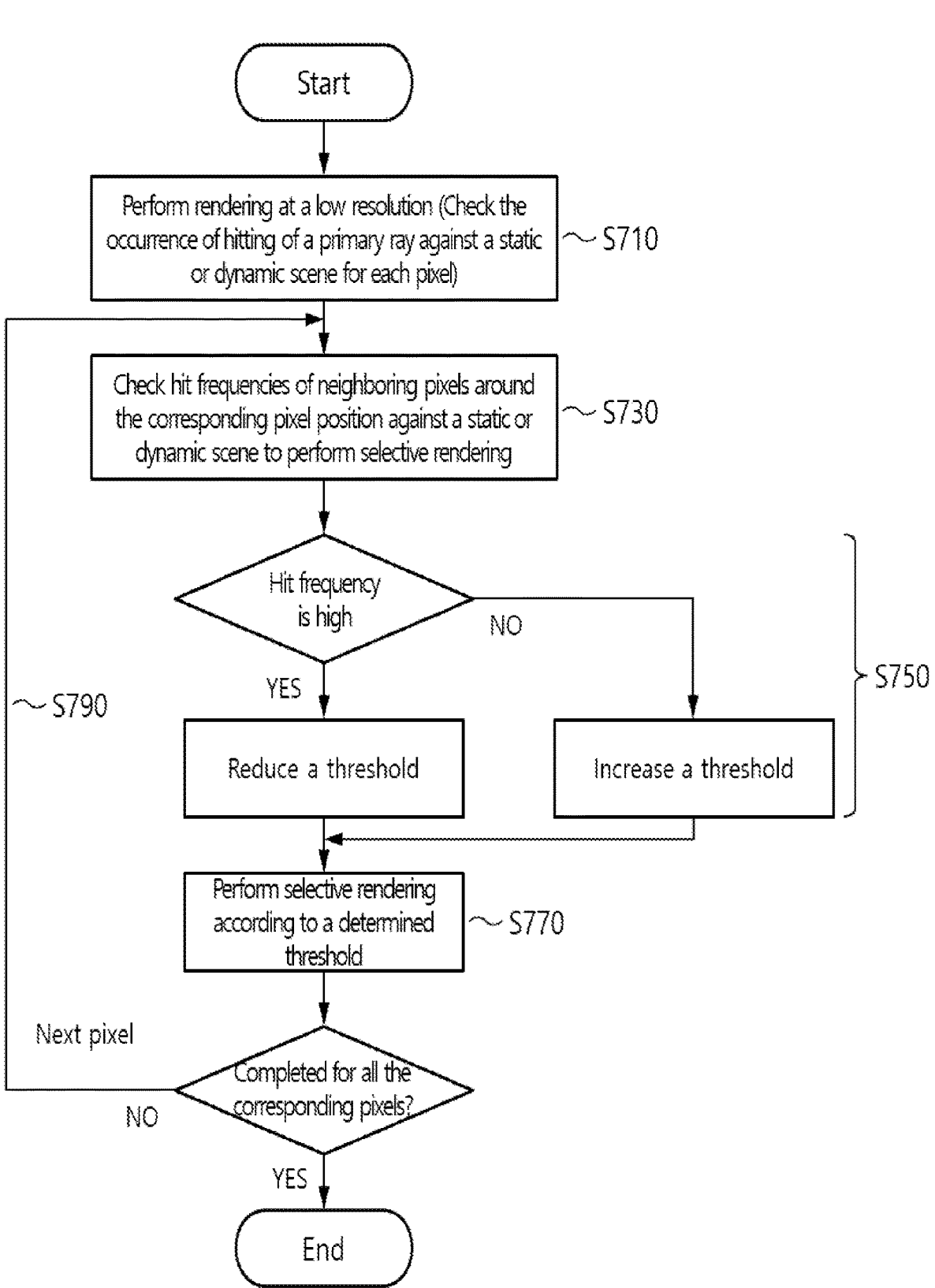
FIG. 7 is a flow diagram illustrating one embodiment of a ray tracing process according to the present disclosure.

FIG. 6 is a flow diagram illustrating a ray tracing method according to the present disclosure, and FIG. 7 is a flow diagram illustrating one embodiment of a ray tracing process according to the present disclosure.

Referring to FIGS. 6 and 7, the ray tracing device 500 may perform rendering at a low resolution through the first rendering unit 510 S610. At this time, the first rendering unit 510 may check whether a primary ray of each pixel hits a static scene or a dynamic scene 5710.

Also, the ray tracing device 500 may generate a high-resolution image based on a low-resolution image through the second rendering unit 530 S630. To this end, the second rendering unit 530 may determine unrendered pixels as candidate pixels to generate a second image and repeatedly perform selective rendering for each candidate pixel.

More specifically, referring to FIG. 7, the second rendering unit 530 may check hit frequencies of neighboring pixels around a specific pixel position against a static or dynamic scene to perform selective rendering S730. When the hit frequency against a dynamic scene is higher than the hit frequency against a static scene, the threshold for selective rendering may be lowered, while the threshold may be increased in the opposite case S750. The second rendering unit 530 may determine a specific color value by performing selective rendering at the position of the specific pixel based on an adjusted threshold S770. For example, if a color difference between pixels adjacent to the position of the unrendered specific pixel is smaller than the adjusted threshold, the color value may be determined through interpolation, but the color value may be determined through ray tracing in the opposite case.

The second rendering unit 530 may sequentially perform threshold adjustment and selective rendering on one candidate pixel; when rendering of the corresponding candidate pixel is completed, the second rendering unit 530 may repeatedly perform the operation on the next candidate pixel S790. In the process of generating a high-resolution image through up-sampling of a low-resolution image, the second rendering unit 530 may determine a color value for an unrendered pixel through selective rendering and adjust a threshold for selective rendering adaptively according to the degree of visual attention, thereby effectively enhancing the rendering performance while reducing degradation of image quality.

Although the present disclosure has been described with reference to preferred embodiments given above, it should be understood by those skilled in the art that various modifications and variations of the present disclosure may be made without departing from the technical principles and scope specified by the appended claims below.

DESCRIPTIONS OF SYMBOLS

411, 413: Horizontal pixel values
430: Unrendered pixel
451, 453: Vertical pixel values
500: Ray tracing device
510: First rendering unit
530: Second rendering unit
531: Candidate pixel extraction module
533: Hit frequency detection module
535: Threshold adjustment module
537: Rendering module

The invention claimed is:

1. A visual attention-based ray tracing method for a dynamic scene, the method comprising:

identifying whether a primary ray for each sampling pixel hits a static scene or a dynamic scene constituting a specific scene during a process of generating a first image by rendering the specific scene at a first resolution; and performing selective rendering repeatedly on candidate pixels existing between the sampling pixels during a process of generating a second image by rendering the first image at a second resolution higher than the first resolution through adaptive adjustment of a threshold, wherein the adaptive adjustment of the threshold comprises:

identifying a first hit frequency of neighboring sampling pixels hitting the dynamic scene and a second hit frequency of neighboring sampling pixels hitting the static scene;

reducing the threshold when the first hit frequency is higher than the second hit frequency; and increasing the threshold when the first hit frequency is lower than the second hit frequency.

2. The method of claim 1, wherein the determining of the occurrence of hitting includes determining whether the primary ray hits a static scene or a dynamic scene constituting the specific scene.

3. The method of claim 2, wherein the determining of the occurrence of hitting includes determining the occurrence of hitting as a result of an intersection test on an acceleration structure (AS) corresponding to the static scene and the dynamic scene.

4. The method of claim 1, wherein the performing repeatedly includes determining the hit frequency by counting the occurrence of hitting of neighboring pixels for each candidate pixel; and reducing a reference threshold when the hit frequency exceeds a preset reference count and increasing the reference threshold when the hit frequency is lower than the reference count.

5. The method of claim 4, wherein the performing repeatedly includes determining a decrement or an increment for the reference threshold according to a) a difference between the hit frequency and the reference count or b) a difference between the first and second hit frequencies.

6. The method of claim 1, wherein the performing repeatedly includes reducing a reference threshold when a first hit frequency for a dynamic scene is higher than a second hit frequency for a static scene and increasing the reference threshold when the first hit frequency is lower than the second hit frequency.

7. The method of claim 1, wherein the performing repeatedly includes determining a color for a specific candidate pixel by applying an interpolation algorithm when a color difference between adjacent sampling pixels on both sides of the specific candidate pixel in the vertical or horizontal direction is smaller than an adjusted threshold.

8. The method of claim 1, wherein the performing repeatedly includes determining a color for a specific candidate pixel by applying ray tracing when a color difference between adjacent sampling pixels on both sides of the specific candidate pixel in the vertical or horizontal direction is larger than an adjusted threshold.

9. The method of claim 1, wherein the performing repeatedly includes providing the second image as a rendering result for the specific scene when the selective rendering is completed for all the candidate pixels.

10. A visual attention-based ray tracing device for a dynamic scene, the device comprising:

a first rendering unit determining the occurrence of hitting of a primary ray for each sampling pixel on a static scene or a dynamic scene during a process of generating a first image by rendering a specific scene at a first resolution; and a second rendering unit performing selective rendering repeatedly on candidate pixels existing between the sampling pixels during a process of generating a second image by rendering the first image at a second resolution higher than the first resolution through adaptive adjustment of a threshold, wherein the second rendering unit comprises:

a hit frequency detection module detecting a first hit frequency of neighboring pixels for a specific candidate pixel hitting the dynamic scene and a second hit frequency of neighboring pixels hitting the static scene; and a threshold adjustment module adjusting a reference threshold by reducing the reference threshold when the first hit frequency is higher than the second hit frequency, and increasing the reference threshold when the first hit frequency is lower than the second hit frequency.

11. The device of claim 10, wherein the second rendering unit includes a candidate pixel extraction module determining candidate pixels existing between sampling pixels of the first image;

a hit frequency detection module detecting hit frequencies of neighboring pixels for a specific candidate pixel;

a threshold adjustment module adjusting a reference threshold adaptively by comparing hit frequencies for a static scene and a dynamic scene; and a rendering module determining a color of the specific candidate pixel by performing the selective rendering according to the adjusted reference threshold.

12. The device of claim 11, wherein the threshold adjustment module reduces a reference threshold when a first hit frequency for the dynamic scene is higher than a second hit frequency for the static scene and increases the reference threshold when the first hit frequency is lower than the second hit frequency.

13. The device of claim 12, wherein the threshold adjustment module determines a decrement or an increment for the reference threshold according to a difference between the first and second hit frequencies.

\* \* \* \* \*